(12) United States Patent
Steber et al.

(10) Patent No.: US 7,565,805 B2
(45) Date of Patent: Jul. 28, 2009

(54) METHOD FOR OPERATING GAS TURBINE ENGINE SYSTEMS

(75) Inventors: Charles Evan Steber, Decatur, GA (US); Massoud Parisay, Acworth, GA (US); Ravindra Annigeri, Roswell, GA (US); Willy Steve Ziminsky, Simpsonville, SC (US); John Stephen Henderson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 631 days.

(21) Appl. No.: 11/284,491

(22) Filed: Nov. 22, 2005

(65) Prior Publication Data

US 2007/0113560 A1 May 24, 2007

(51) Int. Cl.
*F02C 3/22* (2006.01)
*F02C 9/26* (2006.01)
(52) U.S. Cl. .................... 60/776; 60/39.281; 60/39.465
(58) Field of Classification Search ............. 60/39.281, 60/39.465, 734, 773, 776
See application file for complete search history.

(56) References Cited

U.S. PATENT DOCUMENTS

| | | | |
|---|---|---|---|
| 4,359,284 A | 11/1982 | Kude et al. | |
| 4,659,306 A | 4/1987 | Altermark et al. | |
| 5,386,851 A | 2/1995 | Clements et al. | |
| 5,485,728 A | 1/1996 | Dickinson | |
| 5,486,107 A | 1/1996 | Bonne | |
| 5,685,153 A | 11/1997 | Dickinson et al. | |
| 6,082,092 A | 7/2000 | Vandervort | |
| 6,370,880 B1 | 4/2002 | Smith et al. | |
| 6,779,333 B2 | 8/2004 | Gerhold | |
| 6,839,613 B2 | 1/2005 | McCarthy et al. | |
| 6,901,735 B2 | 6/2005 | Lohn | |
| 7,472,540 B2 * | 1/2009 | Berenbrink et al. | ...... 60/39.281 |

(Continued)

FOREIGN PATENT DOCUMENTS

CN 1419043 A 5/2003

(Continued)

OTHER PUBLICATIONS

"Specification for Fuel Gases for Combustion in Heavy-Duty Gas Turbines"; GEI 41040G; 1999; Revised, Jan. 2002; 23 pgs.

(Continued)

*Primary Examiner*—Louis J Casaregola
(74) *Attorney, Agent, or Firm*—Armstrong Teasdale LLP

(57) ABSTRACT

Methods and systems for operating a gas turbine engine system include an electrical generator configured to provide electrical energy to a load, a gas turbine engine including at least one combustor that includes a plurality of fuel injection points configured to inject a fuel into the combustor at a plurality of different locations wherein the combustor configured to combust the fuel and the gas turbine engine is rotatably coupled to the generator through a shaft. The gas turbine engine system includes a control system including a plurality of sensors positioned about the gas turbine engine system and configured to measure at least one parameter associated with the sensor, a processor programmed to receive a signal indicative of a heating value of the fuel, and automatically control a fuel split between the fuel injection points on the combustor using the determined heating value.

13 Claims, 3 Drawing Sheets

U.S. PATENT DOCUMENTS

| | | | |
|---|---|---|---|
| 2003/0022051 A1 | 1/2003 | Haluzak | |
| 2003/0056514 A1 | 3/2003 | Lohn | |
| 2004/0206090 A1 | 10/2004 | Yee et al. | |
| 2004/0206091 A1 | 10/2004 | Yee et al. | |
| 2005/0022537 A1 | 2/2005 | Lohn | |
| 2005/0028530 A1* | 2/2005 | Doebbeling et al. | 60/773 |
| 2005/0107941 A1 | 5/2005 | Healy | |
| 2005/0114010 A1 | 5/2005 | Healy et al. | |

FOREIGN PATENT DOCUMENTS

| | | |
|---|---|---|
| JP | 63143339 A | 6/1988 |
| WO | WO 2005/038214 * | 4/2005 |

OTHER PUBLICATIONS

Frank J. Brooks; "GE Gas Turbine Performance Characteristics"; GER-3567H; (Oct. 2000); 16 pgs.

L.B. Davis et al.; "Dry Low NOx Combustion Systems for GE Heavy-Duty Gas Turbines"; GER-3568G;(Oct. 2000); 22 pgs.

Bruce Kelly et al; "Optimization Studies for Integrated Solar Combined Cycle Systems"; 2001 by ASME; 7 pgs.

Michael Nakhamkin et al.; "Humid Air Injection Power Augmentation Technology Has Arrived"; ASME GT2003-38977; 2003 by ASME; 7 pgs.

D.M. Erickson et al.; "Design Considerations for Heated Gas Fuel"; GER-4189B;(Mar. 2003); 16 pgs.

First Office Action dated Mar. 20, 2009 related to Patent Application No. 200610172393.

* cited by examiner

METHOD FOR OPERATING GAS TURBINE ENGINE SYSTEMS

BACKGROUND OF THE INVENTION

This invention relates generally to gas turbine engine combustion systems, and more particularly, to methods and apparatus for controlling the operation of the combustion systems.

Gas turbine engines typically include a compressor section, a combustor section, and at least one turbine section. The compressor discharge air is channeled into the combustor where fuel is injected, mixed and burned. The combustion gases are then channeled to the turbine which extracts energy from the combustion gases.

Gas turbine engine combustion systems must operate over a wide range of flow, pressure temperature and fuel/air ratio operating conditions. Controlling combustor performance is required to achieve and maintain satisfactory overall gas turbine engine operation and to achieve acceptable emissions levels, the main concern being $NO_x$ and CO levels.

One class of gas turbine combustors achieve low $NO_x$ emissions levels by employing lean premixed combustion wherein the fuel and an excess of air that is required to burn all the fuel are mixed prior to combustion to control and limit thermal $NO_x$ production. This class of combustors, often referred to as Dry Low $NO_x$ (DLN) combustors requires more careful management of combustion conditions to achieve stable operation, acceptable $NO_x$ and CO emissions while remaining free of pressure oscillations called dynamics usually related to the combination of acoustics and unsteady energy release of the combustion process. Such systems often require multiple independently controlled fuel injection points or fuel nozzles in each of one or more parallel identical combustors to allow gas turbine operation from start-up through full load. Furthermore, such DLN combustion systems often function well over a relatively narrow range of fuel injector pressure ratio and said pressure ratio is a function of fuel flow rate, fuel passage flow area, gas turbine cycle pressures before and after the fuel nozzles. Such pressure ratio limits are managed by selection of the correct fuel nozzle passage areas and regulation of the fuel flows to the several fuel nozzle groups. The correct fuel nozzle passage areas are based on the actual fuel properties which are nominally assumed to be constant.

Historically, pipeline natural gas composition in general and specifically its Modified Wobbe Index has varied only slightly. The Modified Wobbe Index (MWI) is proportional to the lower heating value in units of btu/scf and inversely proportional to the square root of the product of the specific gravity of the fuel relative to air and the fuel temperature in degrees Rankine. Fuel nozzle gas areas are sized for a limited range of fuel MWI, typically less than about plus or minus five percent of the design value, and for gas turbine with Dry Low NOx combustion systems with multiple fuel injection points, the gas turbine combustion system is set up with fuel distribution schedules such that the fuel splits among the various injection points vary with machine operating conditions. For some DLN combustion systems, if fuel properties change by a value of more than about plus or minus two percent in MWI, it is necessary to make fuel schedule adjustments while monitoring both emissions and combustion dynamics levels. Such fuel schedule adjustments is called "tuning" and is a process requires technicians to set up special instrumentation and may take a day or longer to accomplish. Furthermore, when the fuel supplied to a specific gas turbine installation is from more than one source which are of different compositions and resulting MWI, it is necessary to "retuning" the fuel split schedules and, prior to the invention disclosed herein must repeated for fuel supply switch. Furthermore, any blend of the two or more fuels is the equivalent of another fuel composition and as a result a variable blend of the fuels cannot be tolerated prior to the subject invention.

In addition, gas turbine engine efficiency can be improved by employing an available source of heat such as low energy steam or water to preheat the fuel gas entering the gas turbine combustor. For gas turbines employing heated gas load up time may depend on the time required to generate hot water in the initially cool heat recovery steam generator to heat the fuel gas to a minimum required level. Until the fuel gas reaches the required temperature and consequently the required MWI, some combustor designs are unable to operate in the low $NO_x$ combustion mode. If the minimum acceptable gas temperature level can be reduced, which corresponds to raising the maximum permissible MWI value, gas turbine operations are improved and total emissions reduced by shortened load up times.

Specifically, it is desirable to permit a larger variation in gas fuel composition, temperature and resulting MWI, while maintaining low emissions and combustion dynamics levels within predetermined limits. Operation outside of the design MWI range can for some of the DLN combustion systems result in combustion dynamics levels (noise due to oscillatory combustion process) that is large enough to shorten the maintenance intervals or even cause hardware damage and forced outages.

BRIEF DESCRIPTION OF THE INVENTION

In one embodiment, a gas turbine engine is coupled by a drive shaft to an electrical generator as the principle gas turbine load. In this embodiment a gas turbine engine includes at least one combustor that includes a plurality of fuel injection nozzles configured to inject fuel into the combustor(s) at a plurality of different location in each combustor and wherein the different injection nozzles are supplied by fuel from more than one gas flow control valve. The gas turbine engine system includes a control system including a plurality of sensors positioned about the gas turbine engine system and configured to measure flow, pressure, temperature or other parameters to establish engine operating state, a processor programmed to receive the afore mentioned parameters plus a signal indicative of the MWI of the fuel to automatically control a fuel split among the fuel injection nozzles according to the engine state and the signal indicative of the fuel MWI. Typically the fuel split is varied only according to the engine state which varies with load and ambient temperature, pressure and humidity such that the fuel splits follows one or more schedules based on engine state. In this embodiment, the fuel split schedule is automatically adjusted according to the parameter indicating fuel MWI.

In another embodiment, a method of operating a gas turbine engine includes determining the heating value and specific gravity of the fuel and computing the resulting the MWI. In other respects this embodiment is the same as that embodiment described above.

In yet another embodiment, the fuel parameter indicating MWI or the actual MWI is determined prior to a fuel heater. In this embodiment, the control system compares the design MWI vs. the indicated MWI prior to the fuel heater and raises the fuel temperature to cause it to have an MWI value equal to the design MWI.

In still another embodiment, a method of operating a gas turbine engine includes determining a first fuel split schedule at a first MWI value by employing the tuning process, modifying the first fuel MWI a second fuel MWI by changing the fuel temperature and then determining a second fuel split schedule at the second fuel MWI value. Then during normal operation without technicians monitoring emissions or combustion dynamics the fuel properties and resulting MWI is continuously determined and the fuel split that is applied is determined by a functional relationship of the first and second fuel split schedules.

In another embodiment, the gas turbine control system continuously receives fuel properties sufficient to calculate fuel MWI and maintains fuel temperature compatible with the improved efficiency of higher inlet fuel temperatures and modulates fuel splits in the fashion indicated in the fourth embodiment.

DETAILED DESCRIPTION OF THE INVENTION

While the methods and apparatus are herein described in the context of a gas turbine engine used in an industrial environment, it is contemplated that the method and apparatus described herein may find utility in other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration, rather than limitation.

Figure 1:
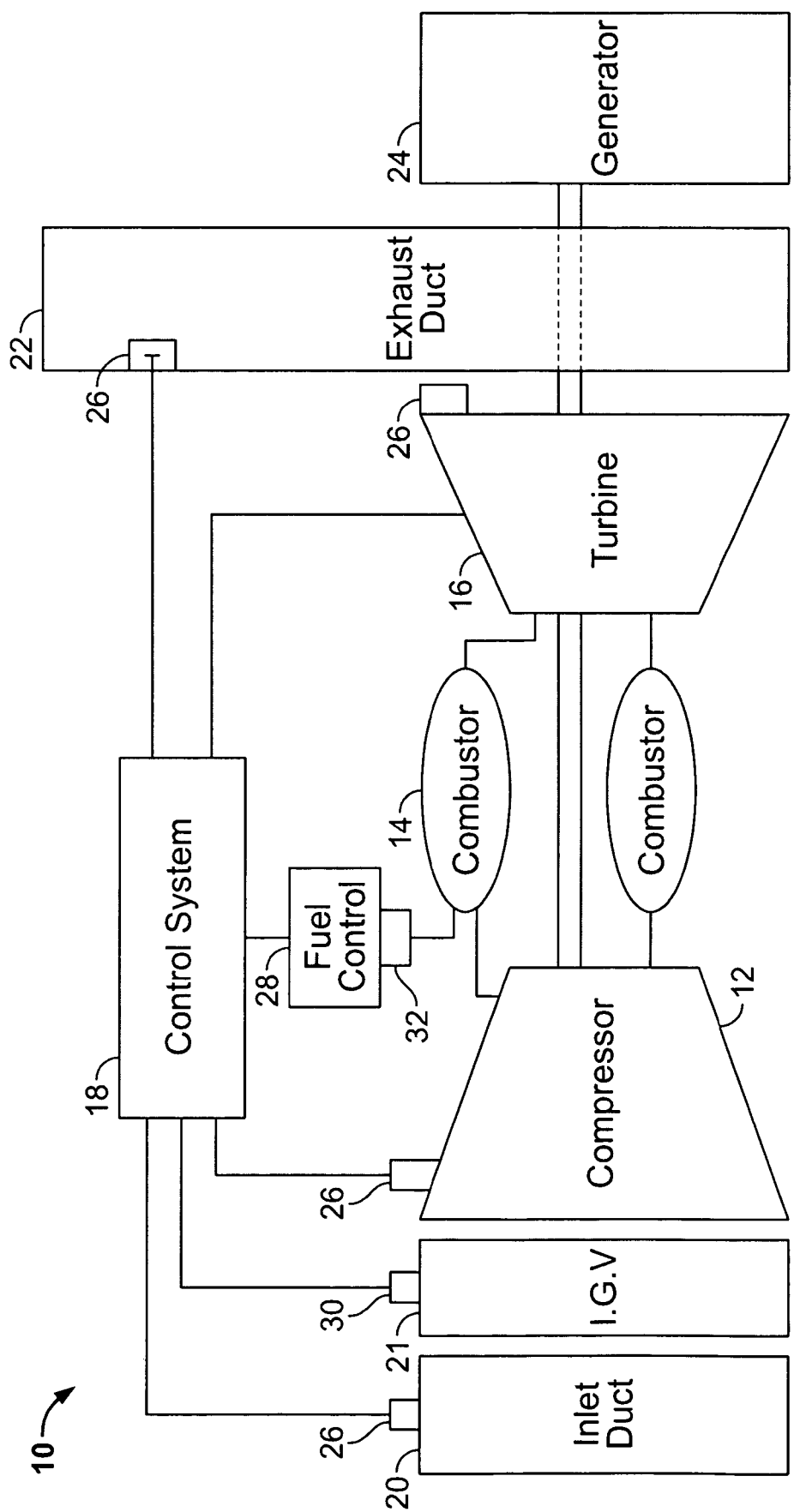
FIG. 1 is a schematic diagram of a gas turbine engine system.

FIG. 1 is a schematic diagram of a gas turbine engine system 10 including a compressor 12, a combustor 14, a turbine 16 drivingly coupled to compressor 12, the gas turbine engine managed by a combination of operator commands and a control system 18. An inlet system 20 channels ambient air to the compressor inlet guide vanes 21 which by modulation with actuator 26 regulates amount of air to compressor 12. An exhaust system 22 channels combustion gases from the outlet of turbine 16 through, for example, sound absorbing, heat recovery and possibly other emissions control devices. Turbine 16 may drive a generator 24 that produces electrical power or any other type of mechanical load.

The operation of the gas turbine engine system 10 may be monitored by several sensors 26 detecting various conditions of compressor 12, turbine 16, generator 24 and ambient environment. For example, sensors 26 may monitor ambient temperature, pressure and humidity surrounding gas turbine engine system 10, compressor discharge pressure and temperature, turbine exhaust gas temperature, and other pressure and temperature measurements within the gas turbine engine. Sensors 26 may also comprise flow sensors, speed sensors, flame detector sensors, valve position sensors, guide vane angle sensors, and other sensors that sense various parameters relative to the operation of gas turbine engine system 10. As used herein, "parameters" refer to physical properties whose values can be used to define the operating conditions of gas turbine engine system 10, such as temperatures, pressures, and fluid flows at defined locations.

In addition to the above mentioned sensors 26 there is one or more sensors to monitor or measure fuel properties sufficient to determine fuel MWI prior to or after the optional fuel heater. The determination of a parameter representative of the fuel MWI such as only fuel temperature for fixed fuel properties is a requirement in order to employ the subject invention.

A fuel controller 28 responds to commands from the control system 18 to regulate the fuel flowing from a fuel supply to the combustor(s) 14, and the fuel splits to multiple fuel nozzle injectors located within each of the combustor(s) 14. Fuel control system 28 may also be directed by the controller 18 to select the type of fuel or a mix of fuels for the combustor if more than one fuel is available. The fuel controller 28 may be a separate unit or may be a component of control system 18.

Control system 18 may be a computer system having a processor(s) that executes programs to control the operation of the gas turbine using sensor inputs and instructions from human operators. The programs executed by the control system 18 may include scheduling algorithms for regulating fuel flow and fuel splits to combustor(s) 14. The commands generated by the control system cause actuators in the fuel controller 28 to regulate the flow and fuel splits and type of fuel flowing to the combustors; adjust inlet guide vanes 21 on the compressor, and activate other control settings on the gas turbine.

Control system 18 regulates the gas turbine based, in part, on algorithms stored in computer memory of the controller. These algorithms enable control system 18 to maintain the combustor firing temperature to within predefined temperature limits and to maintain the turbine exhaust $NO_x$ and CO emissions to below predefined limits. The algorithms have inputs for parameter variables for ambient air conditions, inlet pressure loss and turbine exhaust back pressure, fuel flow, compressor discharge pressure and exhaust temperature. The combustor 14 may be a DLN combustion system. Control system 18 may be programmed and modified to control the fuel splits for the DLN combustion system according to predetermined fuel split schedules modified by a tuning process which occur at roughly one year intervals to optimize emissions and combustion dynamics.

The schedules and algorithms executed by control system 18 accommodate variations the afore mentioned parameters which affect firing temperature, $NO_x$, CO, combustor dynamics at part-load through full load gas turbine operating conditions. Control system 18 continuously manages fuel splits with ambient conditions and measured machine parameters. Control system 18 applies algorithms to achieve desired turbine exhaust temperature and compressor discharge pressure by modulating compressor airflow with inlet guide vane angle. Combustor fuel splits are set by the tuning process to satisfy performance objectives while complying with operability boundaries of the gas turbine. All said control functions have a goal to optimize operability, reliability, and availability of the gas turbine.

The fuel controller 28 regulate fuel to two or more injector groups in each combustor to allow modulation of fuel splits, modes of operation, emissions, and combustion dynamics levels versus an array of measured machine parameters through sensors 26. By modulating fuel splits among the several fuel gas control valves, emissions and dynamics are optimized over the machine load range. Fuel split modulation depends primarily on a calculated parameter, called combustion reference temperature, which is a function of machine exhaust temperature, compressor discharge pressure and other continuously monitored machine parameters.

Sensors 26 include at least one fuel property sensor used to determine a parameter indicative of fuel MWI or properties needed to compute MWI. An optional fuel heater 32 may be employed to raise fuel temperature and regulate fuel to achieve either a desired temperature for efficiency reasons and/or a fuel temperature to achieve a desired fuel MWI.

Figure 2:
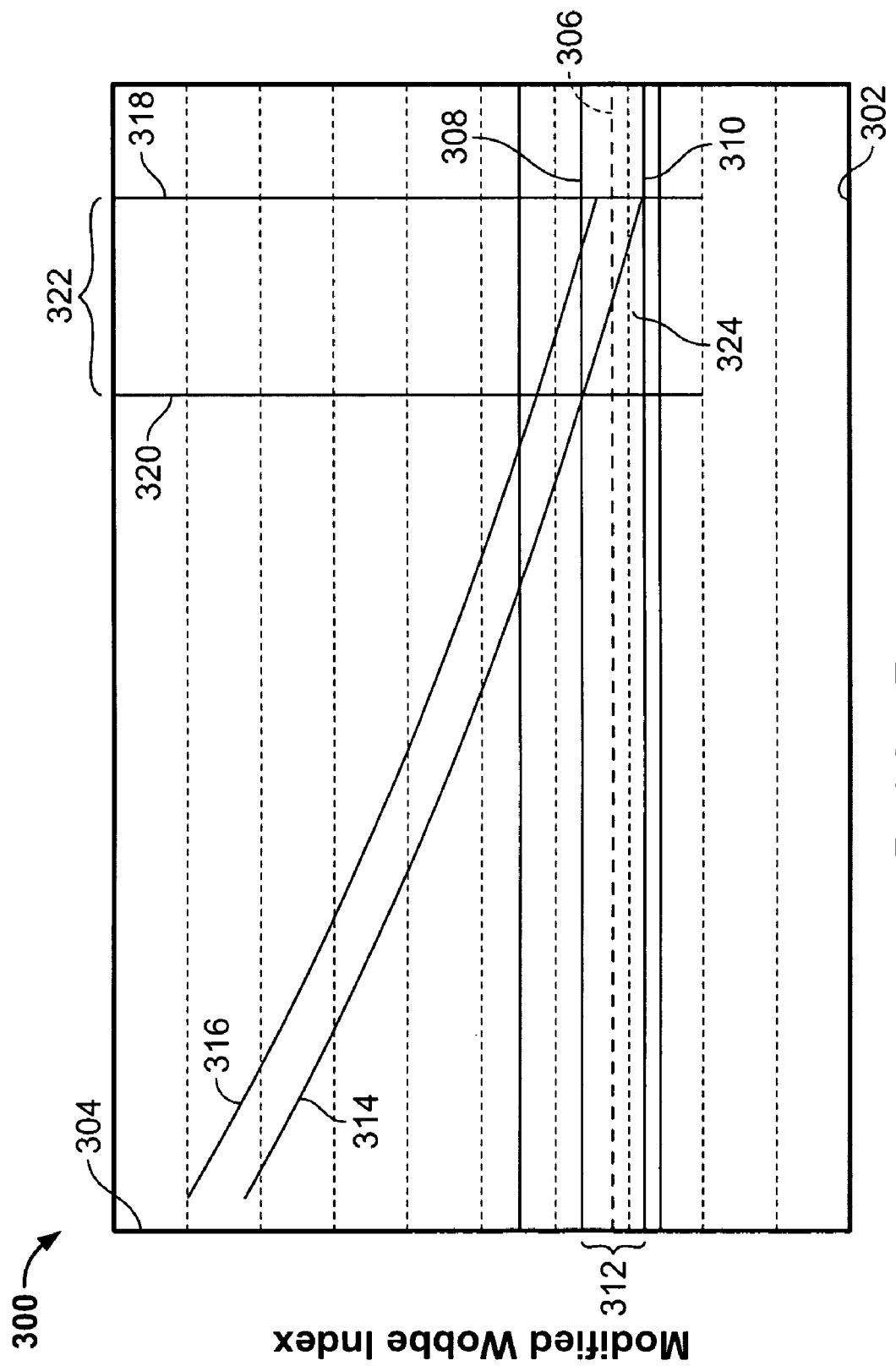
FIG. 2 is a graph of Modified Wobbe Index (MWI) versus fuel gas temperature for an exemplary range of operation of the gas turbine engine shown in FIG. 1.

FIG. 2 is a graph 300 of Modified Wobbe Index (MWI) versus fuel gas temperature for an exemplary range of operation of gas turbine engine 10 (shown in FIG. 1). By selecting the appropriate fuel injection system gas turbine engines can be set up to operate with fuel gases having a relatively wide range of heating values, but the amount of variation that a specific fuel system design can accommodate is limited. The fuel nozzles are designed to operate within a limited range of pressure ratios and changes in heating value and fuel gas temperature are accommodated for by increasing or decreasing the fuel nozzle gas passage area. A measure of the interchangeability of different gas fuels for a given system design is a calculated parameter called the Modified Wobbe Index (MWI). MWI represents a measure of the energy injected into the combustor for a given upstream and downstream pressure across a given fuel nozzle gas orifice and is calculated using the fuel lower heating value, the specific gravity with respect to air and the fuel temperature. The mathematical definition is as follows:

$$MWI = \frac{LHV}{\sqrt{SG_{gas} \times T_{gas}}} \text{ where,}$$

MWI represents the Modified Wobbe Index,
LHV represents the fuel lower heating value, (Btu/scf),
$SG_{gas}$ represents the specific gravity of the fuel gas with respect to air, and
$T_{gas}$ represents the fuel gas temperature in degrees Rankine.

As used herein, LHV represents the heat produced by combustion of one unit of a substance under conditions such that all water in the products remains in the form of vapor. The allowable MWI range for gas turbine engine 10 is established to ensure that predetermined fuel nozzle pressure ratios are substantially maintained during all combustion/turbine modes of operation. If two different fuel gas compositions have the same MWI, the pressure drop in a given fuel system will be the same for both gases. The MWI is thus an indication of energy flow in the system at the same gas pressures and pressure drops. When multiple gas fuels are supplied and/or if variable fuel temperatures result in a MWI that exceed the 5% limitation, independent fuel gas trains, which could include control valves, manifolds and fuel nozzles, may be required for non DLN combustion systems. For Dry Low $NO_x$ (DLN) systems, an alternate control method may be required to ensure that the predetermined fuel nozzle pressure ratios are met. An accurate analysis of all gas fuels, along with fuel gas temperature time profiles may also be evaluated.

Graph 300 includes an x-axis 302 graduated in units of temperature and a y-axis 304 graduated in units of MWI. A dashed line 306 represents a nominal MWI design value for gas turbine engine 10. Line 308 represents a high MWI allowable value and line 310 represents a low MWI allowable value for gas turbine engine 10. An allowable range 312 between lines 308 and lines 310 permits specifications for the fuel system to be determined. In the exemplary embodiment, allowable range 312 is illustrated as being about ±5.0%. Such a range is typical among gas turbine engine found in industry.

However, such a range may be too restrictive for gas turbine engines using a variety of possible fuels. For example, a gas turbine engine designed for operation using natural gas fuel may operate outside of allowable range 312 when an alternative fuel, such as liquefied natural gas, which may originate from a different geographical location and have a different MWI value, for example, a higher MWI value.

Fuels may exhibit a characteristic MWI versus Temperature curve such as a curve 314 that represents the MWI versus Temperature for a fuel, such as natural gas. A curve 316 represents the MWI versus Temperature for liquefied natural gas. Because the MWI of the fuels represented by curves 314 and 316 decreases as the fuel temperature increases (MWI is proportional to the inverse square root of the absolute temperature of the fuel gas), curves 314 and 316 both have a negative slope. This characteristic permits the MWI of the fuel to be modified using waste heat from the combustion process to regeneratively heat the incoming fuel to reduce the MWI of a fuel that would otherwise have a MWI value that exceeded allowable range 312.

The incoming fuel temperature is also limited by a range of temperatures, for example, an upper limit for fuel temperature is represented by a line 318, and a lower limit for fuel temperature is represented by a line 320. Auxiliary equipment associated with gas turbine engine 10 is used to maintain the incoming fuel temperature in a target range 322 for the fuel gas temperature. Accordingly, an operational window 324 of gas turbine engine 10 is defined by MWI range 312 and temperature range 322. A fuel gas with an MWI value represented by curve 314 would be able to meet MWI range 312 for all temperatures within temperature range 322. However, a fuel gas with an MWI value represented by curve 314 would not be able to meet MWI range 312 for all temperatures within temperature range 322. For example, a fuel gas such as a liquefied natural gas or a combination of natural gas and liquefied natural gas would not be able to operate in the full range of window 324 without exceeding range 312 and/or 322.

Automatically modulating fuel gas splits in combustor 26 using measured or calculated fuel gas MWI as a parameter is used to increase the range of possible fuel MWI while maintaining acceptable emissions and combustion dynamics levels. Specifically, the fuel split schedules are determined by on site tuning with near minimum MWI (or maximum fuel gas temperature) and then a second set of schedules are determined by operational testing at or slightly below the maximum intended MWI or minimum intended fuel gas temperature. For MWI values between the high and the low MWI values, the applied fuel splits can be interpolated, for example, linearly, between the high and low MWI limits and maintain both acceptable emissions and combustion dynamics, and for MWI values outside the high and the low MWI values, the applied fuel splits can be extrapolated from the high or low MWI limits. Optimally, only one of the fuel split schedules need be modulated with MWI but two schedules can be modulated if necessary. Due to a large range of actual power plant conditions and the expected gas property range, the allowable variation in gas MWI can be considerable from machine to machine, site to site. In one embodiment, the algorithm for modifying the fuel split schedules operates in real-time to receive the input data from the sensors, process the input data, compute outputs to the fuel valves, and apply those outputs. As used herein, real-time refers to outcomes occurring at a substantially short period after a change in the inputs affecting the outcome, for example, computational calculations. In the exemplary embodiment, calculations are updated in real-time with a periodicity determined by the scan time of the control system and clock speed of the processor.

Figure 3:
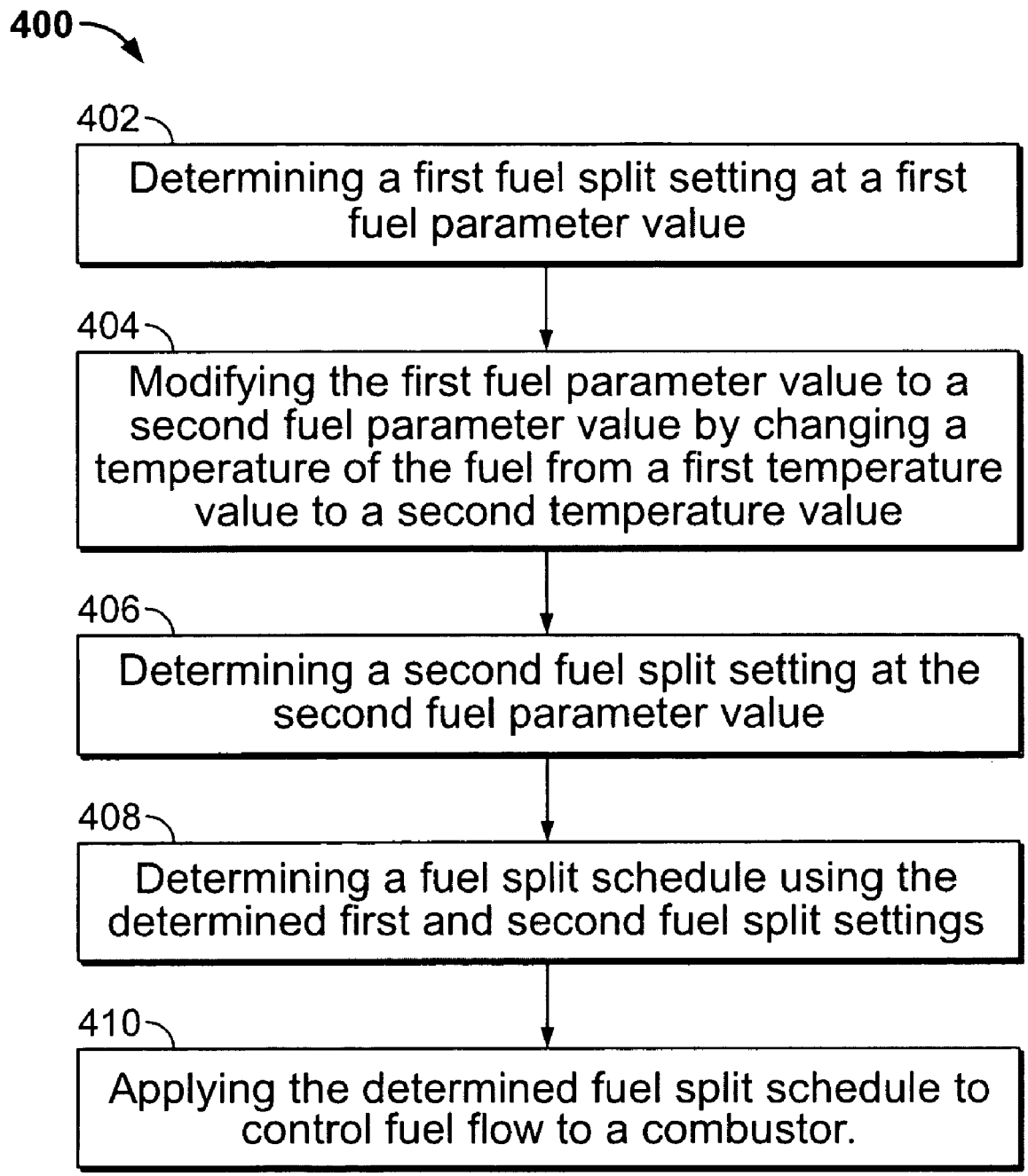
FIG. 3 is a flow chart of an exemplary method of automatically compensating for variable fuel gas properties for combustion gas turbines with dry low $NO_x$ combustion systems such as the gas turbine engine system shown in FIG. 1.

FIG. 3 is a flow chart of an exemplary method 400 of automatically compensating for variable fuel gas properties for combustion gas turbines with dry low $NO_x$ combustion systems. Method 400 includes determining 402 a first fuel split setting at a first fuel parameter value. During a phase of operation a user such as a maintenance technician and/or field engineer controls the MWI of the fuel by adjusting the temperature of the fuel incoming to gas turbine engine 10. Typically raising the temperature lowers the MWI and lowering the temperature tends to increase MWI. While the MWI is held at a selected value, gas turbine engine 10 is tuned to an optimal operating configuration for emissions and combustion dynamics levels. One of the parameters including in the adjustment of fuel flowing to each of the plurality of injection points on combustor 14. The MWI is modified 404 by changing the temperature of the fuel from a first temperature value to a second temperature value. Generally this is accomplished by changing the temperature of the fuel, but may also be affected by changing the heating value of the fuel such as by mixing the incoming streams of fuels with different heating values. A second fuel split setting is determined 406 at the second value of MWI by tuning gas turbine engine 10 to an optimal operating configuration for emissions and combustion dynamics levels at the second value of MWI and noting the proportion of fuel that is being directed to each fuel injection point on the combustors. A fuel split schedule is determined 408 using the determined first and second fuel split settings. Because the MWI versus fuel temperature curves are approximately linear in range 322 a linear interpolation between the fuel split settings at the first and second values of MWI permits an accurate fuel split schedule to be calculated for each value of MWI measured during operation of gas turbine engine 10. For values of MWI outside the first and second values of MWI a linear extrapolation is calculated. In other embodiments, methods of interpolation and extrapolation are used. The determined fuel split schedule is applied 410 to control fuel flow to at least one of the combustors. The fuel split schedule is determined in real-time while the gas turbine engine is supplying electrical energy to an electrical load. During all modes of operation of gas turbine engine 10, control system 22 receives signals indicative of the current fuel split settings for each combustor and of the MWI and temperature of the incoming fuel. From such settings, control system 22 determines if the current fuel split settings match the determined fuel split schedule for the current fuel MWI and temperature.

The at least one fuel property sensor is used to determine a parameter representative of a current fuel MWI or determine an actual current fuel MWI in "real time" and/or continuously. New fuel split values for the first and second fuel split schedules are determined based on measured and calculated gas turbine parameters and current fuel MWI according to a predetermined mathematical relationship such as linear interpolation or extrapolation. A fuel temperature target is achieved using control of the fuel heater to raise or lower fuel temperature to an optimum level concurrent with fuel split adjustments made according to the continuously determined fuel MWI values as described above.

The above-described methods and apparatus provide a cost-effective and reliable means for automatically and continuously modulating gas fuel pre-heat temperature and combustor fuel distribution parameters to permit a relatively large variation in the fuel composition. More specifically, the methods facilitate operation with a relatively large variation in fuels and extant gas fuel pre-heater temperature for heavy duty combustion gas turbines fitted with low $NO_x$ emissions combustion systems. As a result, the methods and apparatus described herein facilitate gas turbine engine operation in a cost-effective and reliable manner.

Exemplary methods and apparatus for monitoring the heating value of a gas turbine engine fuel and controlling the fuel split schedule for fuel supplied to the gas turbine engine combustors are described above in detail. The apparatus illustrated is not limited to the specific embodiments described herein, but rather, components of each may be utilized independently and separately from other components described herein. Each system component can also be used in combination with other system components.

A technical effect of the method and apparatus is to provide a system that automatically and continuously modulates gas fuel pre-heat temperature and combustor fuel distribution parameters to permit a relatively large variation in the fuel composition for use in the gas turbine engine.

While the invention has been described in terms of various specific embodiments, those skilled in the art will recognize that the invention can be practiced with modification within the spirit and scope of the claims.

What is claimed is:

1. A method of operating a gas turbine engine comprising:
   determining a heating value of the fuel;
   providing a combustor including a plurality of fuel injection points to combust the fuel; and
   automatically controlling a fuel split between the fuel injection points on the combustor using the determined heating value, wherein automatically controlling a fuel split between fuel injection points comprises:
   determining a first fuel split setting at a first heating value of the fuel;
   determining a second fuel split setting at a second heating value of the fuel;
   determining a fuel split using the determined first and second fuel split settings; and
   applying the determined fuel split to control fuel flow to the combustor.

2. A method in accordance with claim 1 wherein the heating value is represented by a Modified Wobbe Index (MWI) of the fuel.

3. A method in accordance with claim 2 wherein the Modified Wobbe index of the fuel is determined using:

$$MWI = \frac{LHV}{\sqrt{SG_{gas} \times T_{gas}}} \text{ where,}$$

MWI represents the Modified Wobbe Index,
LHV represents the fuel lower heating value, (Btu/scf),
$SG_{gas}$ represents the specific gravity of the fuel gas with respect to air, and
$T_{gas}$ represents the fuel gas temperature in degrees Rankine.

4. A method in accordance with claim 1 wherein determining a fuel split using the determined first and second fuel split settings comprises at least one of interpolating between the determined first and second fuel split settings using the determined heating value of the fuel and extrapolating beyond the determined first and second fuel split settings using the determined heating value of the fuel.

5. A method in accordance with claim 1 wherein applying the determined fuel split to control fuel flow to the combustor comprises modifying a fuel split schedule for at least one combustor.

6. A method in accordance with claim 1 wherein the gas turbine engine is coupled to a fuel gas preheating system, said method further comprising transmitting to the fuel gas preheating system, a demand signal that modifies a fuel gas temperature.

7. A method of operating a gas turbine engine comprising:
determining a first fuel split setting at a first fuel parameter value;
modifying the first fuel parameter value to a second fuel parameter value by changing a temperature of the fuel from a first temperature value to a second temperature value wherein the second temperature value is different from the first temperature value;
determining a second fuel split setting at the second fuel parameter value;
determining a fuel split schedule using the determined first and second fuel split settings; and
applying the determined fuel split schedule to control fuel flow to a combustor.

8. A method in accordance with claim 7 wherein the combustor includes a plurality of fuel injection points and wherein applying the determined fuel split schedule to control fuel flow to a combustor comprises controlling a proportion of fuel that is injected into each injection point such that the fuel parameter value is changed.

9. A method in accordance with claim 7 wherein determining a fuel split schedule comprises determining the fuel split schedule in real-time while the gas turbine engine is supplying electrical energy to an electrical load.

10. A method in accordance with claim 7 wherein the fuel parameter is represented by a Modified Wobbe Index (MWI) of the fuel.

11. A method in accordance with claim 10 wherein the Modified Wobbe Index of the fuel is determined using:

$$MWI = \frac{LHV}{\sqrt{SG_{gas} \times T_{gas}}} \text{ where,}$$

MWI represents the Modified Wobbe Index,
LHV represents the fuel lower heating value, (Btu/scf),
$SG_{gas}$ represents the specific gravity of the fuel gas with respect to air, and
$T_{gas}$ represents the fuel gas temperature in degrees Rankine.

12. A method in accordance with claim 7 wherein determining a fuel split schedule using the determined first and second fuel split settings comprises at least one of interpolating between the determined first and second fuel split settings using the determined fuel parameter values and extrapolating beyond the determined first and second fuel split settings using the determined fuel parameter values.

13. A method in accordance with claim 7 further comprising:
coupling a fuel gas preheating system to the gas turbine engine; and
transmitting a demand signal that modified a fuel gas temperature to the fuel gas preheating system.

* * * * *

UNITED STATES PATENT AND TRADEMARK OFFICE
CERTIFICATE OF CORRECTION

PATENT NO. : 7,565,805 B2  Page 1 of 1
APPLICATION NO. : 11/284491
DATED : July 28, 2009
INVENTOR(S) : Steber et al.

It is certified that error appears in the above-identified patent and that said Letters Patent is hereby corrected as shown below:

In Claim 3, column 8, line 44, delete "index" and insert therefor --Index--.
In Claim 11, column 10, line 13, delete "LIIV represents" and insert therefor --LHV represents--.

Signed and Sealed this

Ninth Day of February, 2010

David J. Kappos
*Director of the United States Patent and Trademark Office*